2,776,791

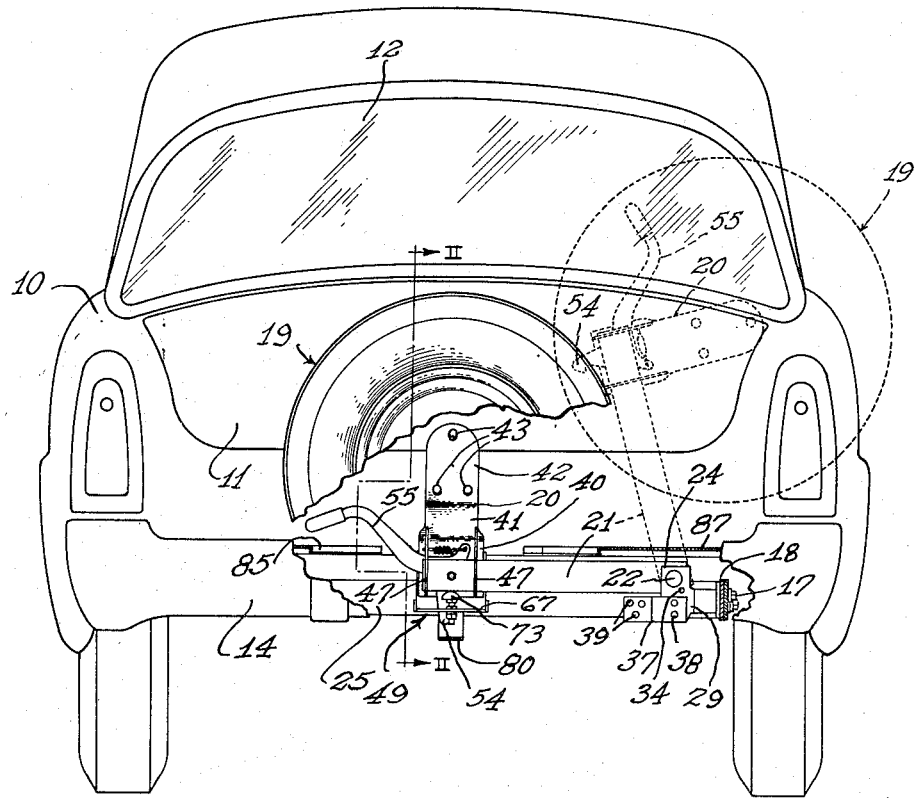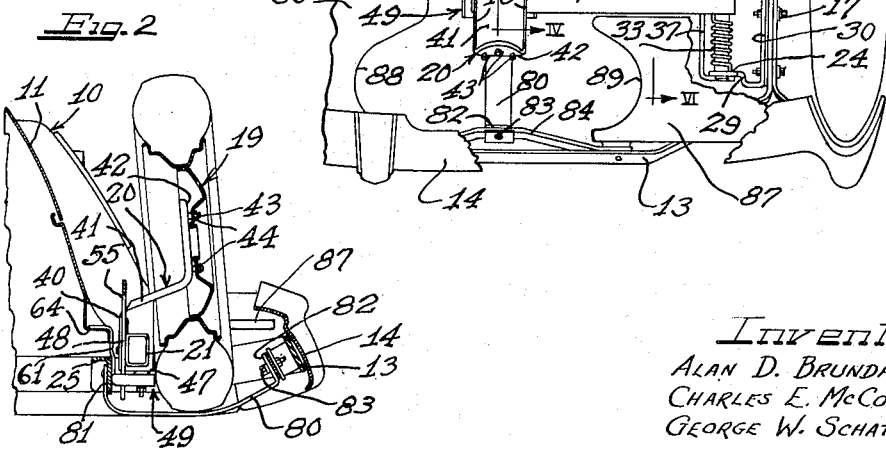

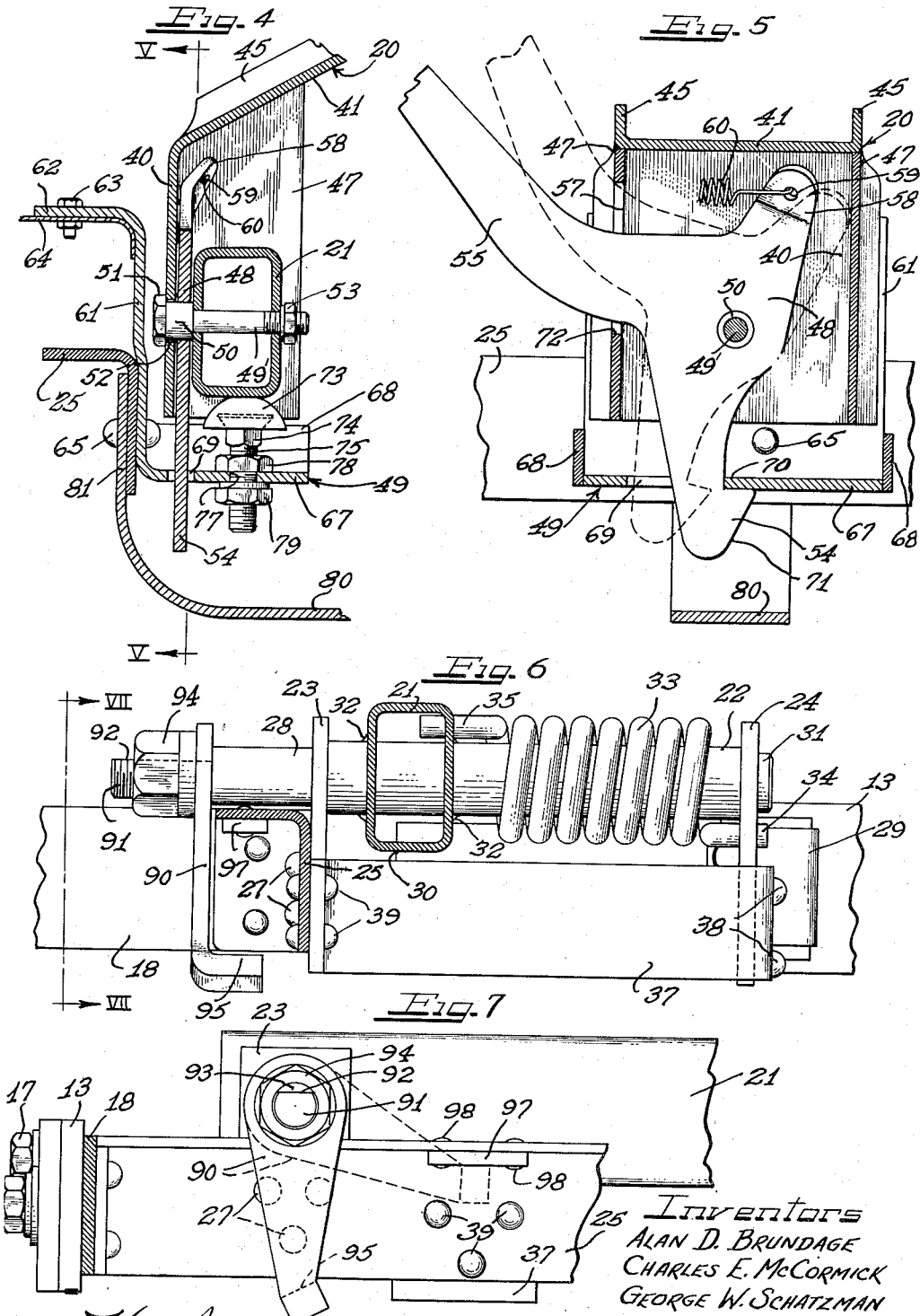

United States Patent Office

Patented Jan. 8, 1957

2,776,791

SPARE WHEEL MOUNT FOR AUTOMOBILES

Alan D. Brundage, Birmingham, Charles E. McCormick, Detroit, and George W. Schatzman, Highland Park, Mich., assignors to Houdaille Industries, Inc., a corporation of Michigan Application February 27, 1953, Serial No. 339,314

6 Claims. (Cl. 224—42.21)

The present invention relates to improvements in automobile structures and more particularly concerns novel means for mounting a spare wheel behind the rear deck or trunk compartment of an automobile in such a manner as to facilitate moving the spare wheel out of the way when access is desired to the rear deck compartment.

An important object of the present invention is to provide an outside spare wheel mount for automobiles enabling swinging of the spare wheel in a vertical plane into and out of a normal or at rest centered position behind the outside of a luggage compartment of the automobile.

Another object of the invention is to provide an outside mounting structure for a spare wheel on an automobile in a manner to enable ready access to the wheel for mounting or removal thereof with respect to the mounting structure.

A further object of the invention is to provide an outside spare wheel mount for automobiles having novel means to facilitate swinging of the spare wheel with minimum effort into and out of a service position.

Still another object is to provide an efficient, rugged and compact swingable spare wheel mount for automobiles adapted to be applied as standard or optional equipment upon an automobile.

Other objects, features and advantages of the present invention will be readily apparent from the following detailed description of a preferred embodiment thereof taken in conjunction with the accompanying drawings in which:

Figure 1 is a more or less schematic rear elevational view of an automobile equipped with a spare tire mount according to the present invention, and with certain parts broken away and in section for illustrative purposes;

Figure 2 is a fragmentary vertical longitudinal sectional view taken substantially on the line II—II of Figure 1;

Figure 3 is a fragmentary top plan view of the rear end portion of the vehicle and the spare wheel mount, showing certain parts broken away or omitted for clarity of illustration;

Figure 4 is an enlarged fragmentary vertical sectional view taken substantially on the line IV—IV of Figure 3;

Figure 5 is a fragmentary vertical sectional view taken substantially on the line V—V of Figure 4;

Figure 6 is a fragmentary enlarged vertical sectional view taken substantially on the line VI—VI of Figure 3; and Figure 7 is a fragmentary vertical sectional and elevational detail view taken substantially on the line VII—VII of Figure 6.

Having reference to Figures 1, 2 and 3, the present invention is adapted to be applied to an automobile comprising a body 10 having in the rear portion thereof a luggage compartment deck closed by an upwardly swinging door 11 below a rear window 12.

Supported at least in part by a generally horizontally extending, transverse, rearwardly projecting generally U-shaped frame bar 13 is a customary ornamental and protective bumper 14 which extends across the rear of the automobile in rearwardly spaced relation to the automobile body 10. Respective opposite and forwardly extending arms 15 (one of which is shown) on the supporting frame bar 13 are secured as by means of bolts 17 to respective rearwardly extending supporting bars 18 carried by the underframe structure of the automobile body 10.

It is customary to carry a spare wheel with a pneumatic tire and tube assembly mounted thereon to replace one of the running wheels of the automobile in an emergency such as when the tire of one of the running wheels blows out or goes flat. According to the present invention such a spare wheel assembly 19 is mounted outside the automobile in centered relation behind the rear trunk compartment and forwardly of the bumper 14. To this end, a spare wheel mount structure is provided comprising a wheel supporting bracket 20 mounted upon the free end portion of a vertically swingable arm 21 secured to a rotary shaft 22. The construction and arrangement of the spare wheel mount is such that the spare wheel can be swung into and out of the normal service position shown centered behind the automobile in full line in Figures 1 and 2. When it is desired to gain access to the trunk compartment through the door 11 of the automobile, the spare wheel 19 is adapted to be swung upwardly and laterally toward one side of the automobile, herein the right side, as shown in dash outline in Figure 1.

Pivotal or rotary support about a horizontal axis extending longitudinally of the automobile is provided for the spare wheel mount rock shaft 22 by respective front and rear spaced, aligned bearing brackets 23 and 24 (Figures 1, 3 and 6). The front journal bracket 23 comprises a plate which is mounted upon a transverse rear angle frame bar 25 of the vehicle body undercarriage frame. Rivets 27 may be utilized to secure the plate 23 against the rear vertical face of the frame bar 25, with the bracket plate 23 projecting above the upper leg or face of the frame bar. By preference, the shaft 22 has a reduced diameter forward concentric journal end portion 28 extending through a suitable bearing aperture in the upper portion of the bearing bracket plate 23.

In a convenient construction, the rear bearing bracket 24 comprises an upstanding ear upon a generally L-shaped bracket arm 29 having an elongated forwardly extending leg 30 secured to the inner face of the adjacent rearwardly extending supporting frame bar 18 of the automobile body frame as by means of the attachment bolts 17. At its rear end the rock shaft 22 is provided with a reduced diameter journal portion 31 which is supported within a suitable bearing aperture in the bracket 24 coaxially aligned with the similar bearing aperture in the forward bracket 23.

For lightness in weight with adequate rigidity, the swingable supporting arm is preferably constructed as a hollow tube of preferably substantially rectangular cross-section. Attachment of the arm 21 to the rock shaft 22 is preferably effected by extending the body portion of the rock shaft 22 through the side walls of the adjacent end portion of the arm 21, as best visualized from Figures 3 and 6, and welding the arm rigidly to the rock shaft as indicated at 32.

Means are provided for counter-balancing the weight of the spare wheel 19 so as to facilitate swinging of the spare wheel from the normal service position into the out of the way position, and return with a minimum of physical energy expenditure on the part of the automobile user. To this end, the shaft supported end of the arm 21 is preferably disposed adjacent to the forward bearing bracket 23 in substantially spaced relation to the rear bearing bracket 24 so as to afford ample space for a counter-balancing coiled torsion spring 33 mounted in encircling relation about the portion of the rock shaft 22 intervening between the arm 21 and the rear bearing bracket 24. At its rear end portion, the spring 33 has a rearwardly extending terminal 34 which is anchored in the bearing bracket 24. The spring 33 is wound to appropriate counter-balancing torsion and has a forwardly directed front end terminal 35 anchored in the shaft-attached end portion of the arm 21. As a result of this arrangement, the weight of the spare wheel 19 is largely counter-balanced by the spring 33 so that the spare wheel can be easily swung from service to trunk clearance position and return.

Since the entire weight of the spare wheel 19 must be supported by the shaft 22 and its supporting bracket structure when the spare wheel is swung up into the clearance position shown in dash outline in Figure 1, additional support for the rear bracket arm 29 is provided. Herein a truss arm 37 of angular form is rigidly secured at one end portion as by means of rivets 38 to the bracket arm 29 below the bearing ear 24. At its opposite angular end portion the truss bar or arm 37 is fixedly secured as by means of rivets 39 to the frame bar 25.

In a satisfactory arrangement, as best seen in Figures 2 and 3, the swingable arm 21 is disposed operatively forwardly of the spare wheel 19 adjacent to the rear extremity of the automobile body 10, and the wheel carrying bracket member 20 is constructed as an angular metallic plate that extends upwardly and rearwardly from the swingable or free end portion of the arm 21. To this end, the supporting bracket plate 20 comprises a lower flange portion 40, an intermediate upwardly and rearwardly oblique offsetting portion 41 and an upper upwardly extending and preferably slightly forwardly obliquely tilted wheel carrying flange 42. Projecting rearwardly from the wheel carrying flange 42 is a group, herein shown as three, of preferably rigid wheel attachment studs 43 by which with the aid of removable nuts 44 the wheel is removably attachable fixedly to the carrying flange. For rigidity, the side margins of the intermediate portion 41 and the carrying flange 42 are preferably turned up to provide reinforcing flanges 45 at the respective opposite sides of the bracket 20.

Rigid attachment of the wheel supporting bracket plate 20 to the swingable arm 21 is suitably effected through the medium of a pair of spaced upright reinforcing and attachment plate members 47 which are secured fixedly as by means of welding in the reentrant corner at the juncture of the lower flange 40 and the intermediate portion 41 of the carrying bracket and extend preferably throughout the length of the lower flange 40 and project rearwardly therefrom as best seen in Figures 1, 2 and 4. The adjacent end portion of the swingable bar 21 extends through the lower portions of the reinforcing plates 47, in alignment, and is fixedly secured to the plates as by means of welding. Through this arrangement, a thoroughly rigid mounting of the supporting bracket plate 20 on the arm 21 is attained.

Since the counter-balancing spring 33 would tend to snap the arm 21 upwardly when the spare wheel 19 is removed from the mount structure, and further since in service the spare wheel 19 would tend to bounce up and down as an incident to bouncing or jarring of the automobile body 10 during travel, latch means are provided to hold the arm 21 positively against unintentional swinging. To this end a releasable latch member 48 is mounted in association with the wheel supporting bracket 20 for retaining engagement with a keeper bracket 49 (Figures 1, 2, 4 and 5). In the present instance, the latch member 48 comprises a generally bellcrank plate which is pivotally mounted between the bracket flange 40 and the adjacent end portion of the swingable arm 21 upon a bearing member in the form of a bolt 49' having a bearing collar 50 adjacent a wrench engageable head 51 engaging the forward face of the bracket flange 40 while the collar projects through an aperture 52 in the bracket flange. The shank of the bolt 49' extends through the side walls of the arm 21 and a nut 53 is threaded upon the rearwardly projecting end portion of the shank of the bolt to secure the bolt in place.

The latch member 48 includes a downwardly projecting latch hook arm 54 and a laterally extending handle portion 55 which is directed into a convenient manipulating position beyond the end of the arm 21. Clearance for the handle portion 55 through the adjacent reinforcing plate 47 is provided by a slot 57 in such plate. An upwardly projecting ear 58 on the latch member is provided with an aperture 59 within which is hooked one end of a tension spring 60 having its other end portion attached to the reinforcing plate 47 through which the handle 55 extends. The spring 60 normally biases the latch member 48 to turn counter-clockwise as viewed in Figures 1 and 5 about its pivotal axis provided by the bearing collar 50.

The keeper 49 comprises a preferably heavy gauge sheet metal bracket 61 (Figures 2 and 4) of right angular Z-shape disposed vertically in forward closely spaced clearance relation to the lower flange 40 of the wheel supporting bracket plate. An upper forwardly directed flange 62 of the keeper bracket is attached by means such as screws 63 (Figure 3) to a horizontally depressed portion 64 in the rear portion of the body 10 of the vehicle above the frame bar 25. In addition, the vertical body portion of the keeper bracket 61 is secured to the vertical side of the frame bar 25 by means such as rivets 65 (Figures 2, 4 and 5). Spaced below the lower extremity of the wheel supporting bracket flange 40 and the associated swingable end of the swingable arm 21, the keeper bracket has a rearwardly directed horizontal keeper flange 67 which is strongly reinforced by side flanges or plates 68 at the side edges of the keeper flange and secured as by welding to such edges and to the lower side edge portions of the vertical body portion of the keeper bracket. Detachable engagement of the latch hook arm 54 with the keeper flange 67 is accommodated through a transverse slot 69 in the keeper flange below the latch member 48 and providing a keeper margin 70 at the right hand end of the slot 69 as viewed in Figure 5, beneath which the latch hook is adapted to engage in latching relation.

Release of the latch hook arm 54 from the keeper margin 70 is effected by lifting up on the handle 55 to swing the latch arm 54 clockwise into released position within the slot 69, as indicated in dash outline in Figure 5. Continued upward manual pressure on the handle 55 causes the wheel supporting bracket 20 and the wheel 19 supported thereby to be swung upwardly with the arm 21 as counter-balanced by the spring 33. Return of the spare wheel is effected by pushing on the wheel to swing it down until the latch arm 54 approaches the keeper flange 67 and a cam edge 71 under the hook of the arm 54 engages the keeper margin 70 and cams the latch hook through the slot 69 until the hook snaps under the keeper margin 70. A limit upon counter-clockwise turning of the latch member 48 under the influence of the biasing spring 60 in the non-latching condition of the latch is determined by a stop shoulder 72 provided at the lower end of the slot 57 through which the latch handle 55 extends.

For supporting the wheel bracket associated end portion of the swingable arm 21 in cushioned relation, a resilient bumper member 73 is supported under the arm by the rearwardly extending portion of the keeper bracket flange 67. In the present instance, the resilient bumper 73 comprises a rubber or rubber-like cap on a head 74 of a threaded adjustable stud 75 extending through an aperture 77 in the flange 67 and secured in adjusted vertical position by means of upper and lower lock nuts 78 and 79 respectively.

Additional support for the spare wheel assembly is provided by a strap member 80 preferably formed of heavy gauge sheet metal and extending in a front to rear direction underlying the wheel supporting bracket 20 in preferably centered relation and at an elevation calculated to have the lower point on the perimeter of the tire of the spare wheel 19 engage the supporting strap 80 in the normal latched position of the spare wheel assembly. Secure mounting of the supporting strap member 80 is effected at its forward portion by the attachment of an upstanding forward terminal flange 81 thereon to the forward face of the depending leg of the frame bar 25 through the medium of the rivets 65. At its rear end portion, the strap member 80 has a generally upwardly directed rear end terminal flange 82 which is secured, preferably adjustably by means of a screw 83, to a forwardly bowed supporting bracket bar 84 secured at its ends to the bumper supporting bar 13 (Figures 2 and 3). While the forward end portion of the supporting strap 80 may be secured fixedly, it is desirable to secure the rear end portion adjustably to accommodate manufacturing tolerances and variables and customer preferences as to tire sizes.

It will be appreciated that the tire of the spare wheel resting upon the strap 80 will substantially cushion the assembly in service, in addition to the cushioning afforded by the stop head 73 underlying the swingable arm 21. Should the tire become soft so that it does not afford full supporting of the assembly, the bumper 73 itself will afford ample support.

In addition to affording service support, the strap 80 also affords support for the spare wheel 19 when it is being placed upon the spare wheel mount or being removed therefrom. Thus, when the spare wheel is to be mounted on the supporting mount, the wheel is lifted into position on the strap member 80 and the bolt-on flange of the wheel is then maneuvered to register the attachment studs 43 of the wheel supporting bracket 20 through appropriate bolt apertures in the bolt-on flange, and the retaining nuts 44 then secured in place to fasten the wheel onto the bracket 20. Likewise, when the wheel is to be removed from the bracket 20, the supporting strap 80 affords support for the wheel as it is canted away from the supporting bracket 20 for lifting out of the well afforded therefor forwardly of the bumper 14.

Rolling of the wheel 19 laterally relative to the relatively narrow supporting strap 80 during placement of the wheel in position on the wheel mount or removal of the wheel from the mount, is avoided by respective left and righ hand gravel guard plate members 85 and 87 which, as best seen in Figure 3 are appropriately recessed at 88 and 89, respectively, to clear the tire of the spare wheel in reasonably close relation.

A limit upon upward swinging of the spare wheel 19 with the arm 21, or stated another way, over-swinging of the spare wheel to out of the way position is limited by a stop arm 90 (Figures 3, 6 and 7) carried by the forward end portion of the rock shaft 22. To this end, the reduced diameter journal forward end portion 28 of the rock shaft is elongated to overlie and extend forwardly from the frame bar 25 and is provided with a further reduced diameter threaded terminal portion 91 which is provided with a keying flat 92. The stop arm 90 is provided with a complementary aperture to fit closely upon the shaft extension 91 and is thus provided with a keying portion 93 cooperating with the keying flat 92 to hold the arm 90 against turning on the shaft. A nut 94 threaded onto the extension 91 secures the stop arm 90 against the end of the journal portion 28 of the shaft.

When the spare wheel mount is in the service condition, the stop arm 90 extends down as shown in full line in Figure 7. When the arm 21 swings up toward the released position, the arm 90 swings upwardly to carry a rearwardly turned stop lug 95 on the free end portion of the stop arm toward a stop shoulder block 97 secured as by means of rivets 98 to the underside of the forwardly directed horizontal flange portion of the frame bar 25. When the stop arm lug 95 engages the stop shoulder block 97 the limit upon release swinging of the arm 21 is attained. It will be appreciated that the stop shoulder block 97 may be a metal block or it may be a resilient cushioning block, as preferred.

It will be understood that modifications and variations may be effected without departing from the scope of the novel concepts of the present invention.

We claim as our invention:

1. In a vehicle including a rear portion having a bumper supported in spaced relation thereto, a spare tire mount including an arm swingably supported and having means thereon for attachment thereto of a spare wheel for disposition in service relation behind the rear end portion of the vehicle and forwardly from the rear bumper, and means defining a well for receiving the lower portion of the spare wheel including an undersupport extending generally between the rear end portion of the vehicle and the bumper, a gravel guard structure recessed to receive opposite side sections of the lower portion of the spare wheel as the spare wheel rests upon said undersupport, said arm being normally biased to swing upwardly, and releasable latch mechanism for retaining said arm against upward movement when the spare wheel is detached from the arm, said undersupport and gravel guard structure cooperating to support the wheel when detached from the arm.

2. In a spare wheel support for an automobile, a frame structure for the rear of the automobile, an arm pivotally mounted on the frame structure adjacent one side thereof to extend into position at about the center of the automobile and carrying a bracket for detachable mounting thereon of a spare wheel to be supported centrally behind the automobile for upward and sideward swinging movement with the arm into an out of the way position above said one side of the frame structure, a latch pivotally mounted on said arm adjacent said bracket, a keeper mounted for retaining engagement by said latch in the centered service position of the spare wheel behind the automobile, and a handle for operating said latch extending therefrom to a substantial extent beyond the bracket for manual access to release the latch from said keeper and then with said handle controlling swinging of said arm.

3. In a spare wheel support for an automobile, a frame structure for the rear of the automobile, an arm pivotally mounted on the frame structure adjacent one side thereof to extend into position at about the center of the automobile and carrying a bracket for detachable mounting thereon of a spare wheel to be supported centrally behind the automobile for upward and sideward swinging movement with the arm into an out of the way position above said one side of the frame structure, a latch pivotally mounted on said arm adjacent said bracket, a keeper mounted for retaining engagement by said latch in the centered service position of the spare wheel behind the automobile, a handle for operating said latch extending therefrom to a substantial extent beyond the bracket for manual access to release the latch from said keeper and then with said handle controlling swinging of said arm, said latch having an ear thereon, and a biasing spring acting between said ear and said bracket for normally biasing the latch into latching position.

4. In a vehicle including a rear portion having a bumper supported in spaced relation thereto, a spare tire mount including an arm swingably supported and having means thereon for attachment thereto of a spare wheel for disposition in service relation behind the rear end portion of the vehicle and forwardly from the rear bumper, means defining a well for receiving the lower portion of the spare wheel including an undersupport extending generally between the rear end portion of the vehicle and the bumper, a gravel guard structure recessed to receive opposite side sections of the lower portion of the spare wheel as the spare wheel rests upon said undersupport, said arm being normally biased to swing upwardly, and releasable latch mechanism for retaining said arm against upward movement when the spare wheel is detached from the arm.

5. In a spare wheel support for an automobile, a frame structure for the rear of the automobile, an arm pivotally mounted on the frame structure adjacent one side thereof to extend into position at about the center of the automobile and carrying a bracket for detachable mounting thereon of a spare wheel to be supported centrally behind the automobile for upward and sideward swinging movement with the arm into an out of the way position above said one side of the frame structure, said bracket and said arm having portions thereof disposed in spaced relation with a pivot member extending therebetween, a latch pivotally mounted in said space on said pivot member for pivotal movement in said space and projecting below the arm, a keeper mounted for retaining engagement by said latch in the centered service position of the spare wheel behind the automobile, and means for operating said latch for releasing the arm to swing the arm upward and sideward into said out of the way position.

6. In a spare wheel mount, a supporting frame structure arranged for disposition at the rear of a vehicle, a pair of spaced bracket arms located at one side of the frame structure and supporting a shaft on a generally front to rear rotary axis, an elongated spare wheel carrying swingable arm fixedly carried by said shaft adjacent to one of said bracket arms and spaced from the other of said bracket arms, said carrying arm projecting from said shaft for generally horizontal service disposition behind the vehicle and thereby extending toward the opposite side of the frame structure, means on the carrying arm spaced from said shaft for attaching a spare wheel, the weight of the spare wheel normally tending to hold the carrying arm in said horizontal position, and a coiled torsion spring mounted about said shaft in the space between said carrying arm and said other of said bracket arms and having one end anchored to said carrying arm and the opposite end anchored to said other bracket arm and normally acting to bias the carrying arm into counter-balanced relation to said spare wheel so as to tend to move the arm and the spare wheel to an out of the way position swung up and toward said one side of said frame structure.

References Cited in the file of this patent

UNITED STATES PATENTS

| | | |
|---|---|---|
| 1,472,983 | Lawrence | Nov. 6, 1923 |
| 1,519,894 | Adams | Dec. 16, 1924 |
| 1,808,983 | Hebeler | June 9, 1931 |
| 2,117,049 | Widman et al. | May 10, 1938 |
| 2,377,149 | Heil | May 29, 1945 |
| 2,553,686 | Stromberg | May 22, 1951 |
| 2,620,105 | Erickson | Dec. 2, 1952 |
| 2,684,237 | Kayler | July 20, 1954 |
| 2,711,273 | Stromberg | June 21, 1955 |